Dec. 12, 1967          S. J. GREEN          3,357,114
IGNITION MISFIRE AND TRACKING SIMULATOR
Filed Jan. 17, 1966          2 Sheets-Sheet 1
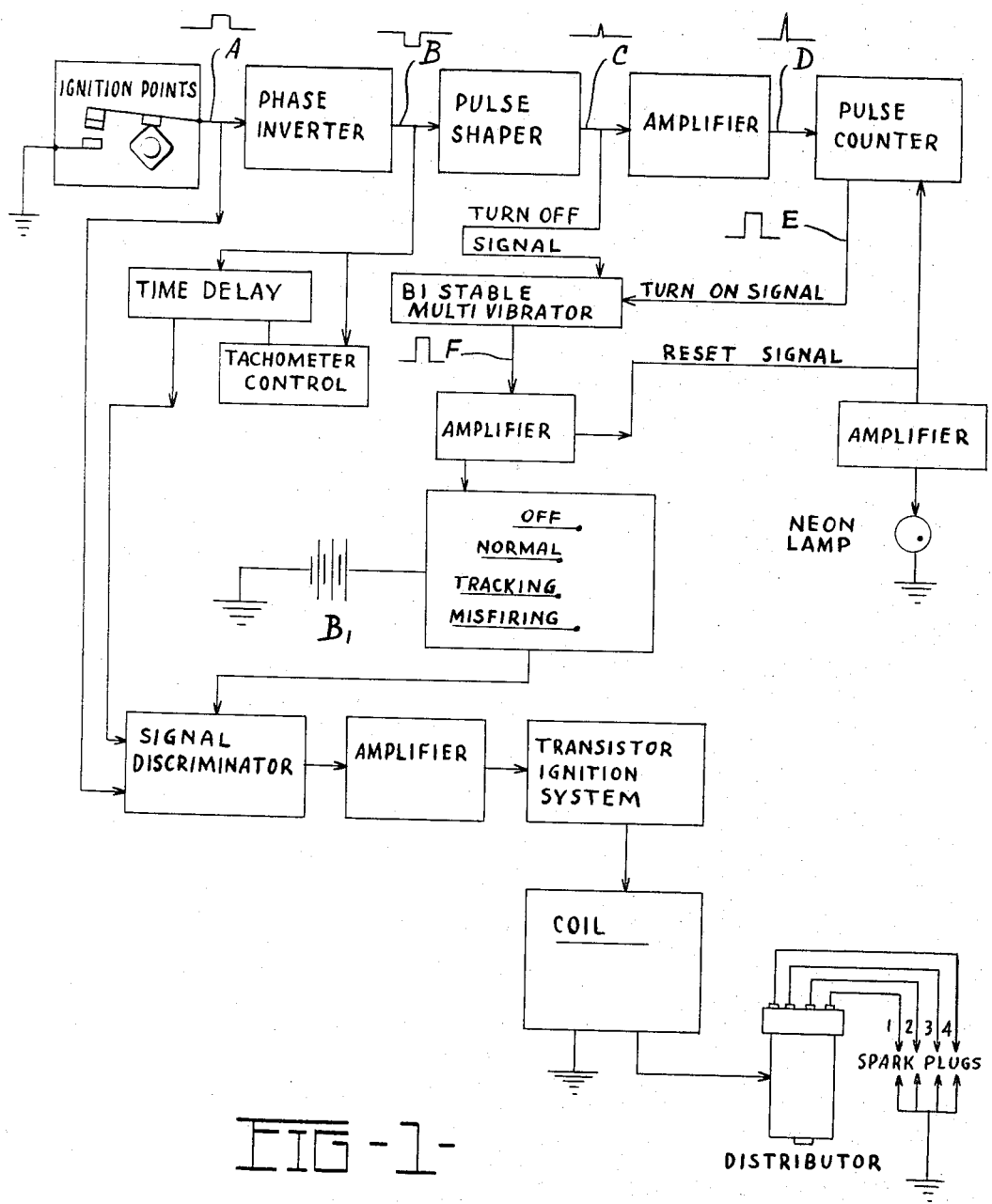
FIG-1-
INVENTOR:
SAM J. GREEN.
BY
ATT'YS.

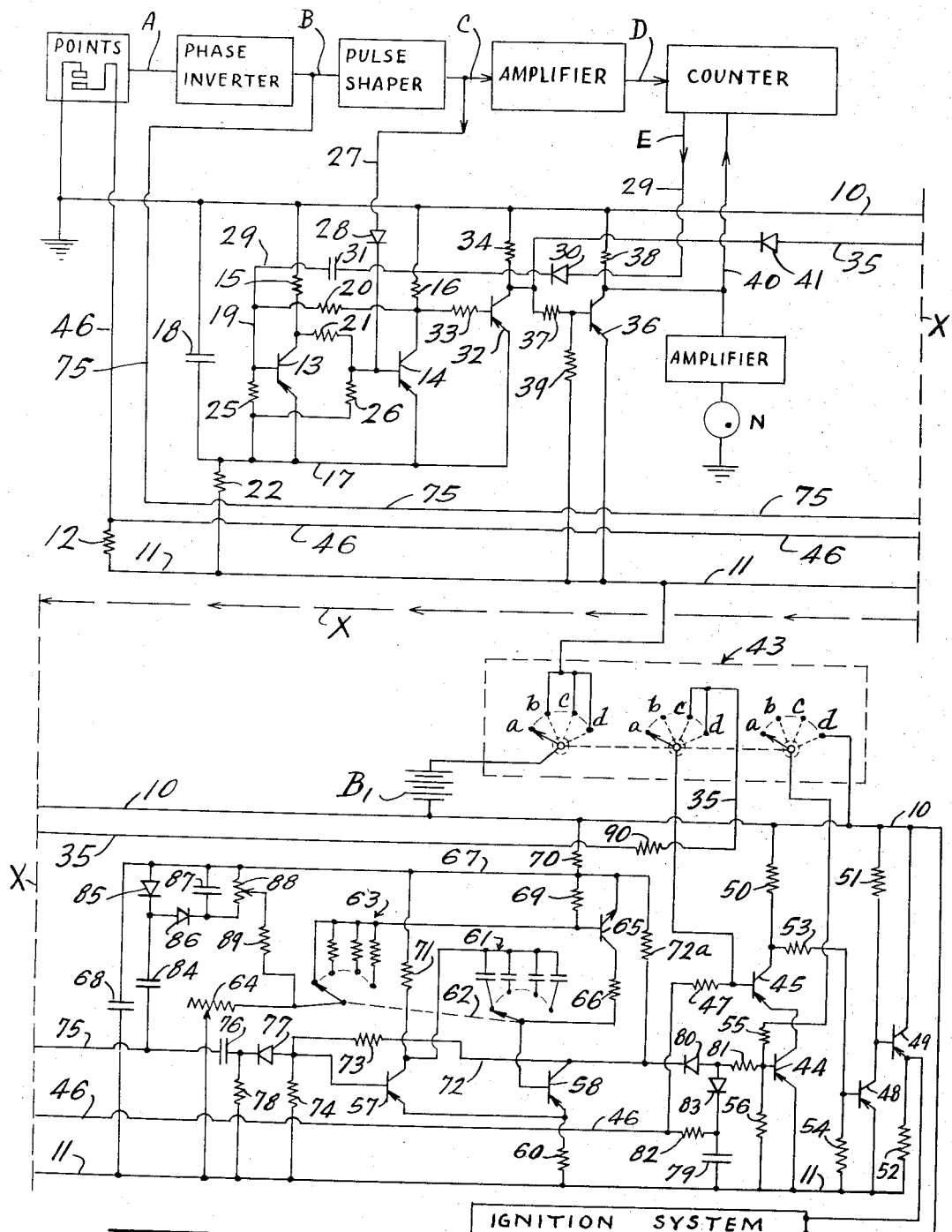
FIG-2-

United States Patent Office 3,357,114
Patented Dec. 12, 1967

3,357,114
IGNITION MISFIRE AND TRACKING SIMULATOR
Sam J. Green, Temperance, Mich., assignor to Champion Spark Plug Company, Toledo, Ohio, a corporation of Delaware
Filed Jan. 17, 1966, Ser. No. 521,162
8 Claims. (Cl. 35—13)

This invention relates to an ignition testing device for use in testing operator reaction to programmed ignition malfunctions. More specifically, this invention relates to a control circuit which may be attached to the ignition system of an automobile in which, through appropriate electronic controls, may be used to cause or simulate commonly occurring ignition malfunctions such as spark plug misfire or tracking.

Misfire is, of course, the failure of one or more spark plugs to fire due to a number of reasons, such as a completely fouled spark plug. Tracking, as used in this specification and claims is defined as a condition where the ignition charge impressed across the spark plug electrodes no longer fires across the gap between the electrodes but fires across the insulator tip from the center electrode tip to the plug shell. This condition is present when sufficient conductive deposits have been built up upon the insulator tip of a plug to present a current path of less resistance than the resistance across the air gap. Tracking causes a fuel ignition delay so that tracking in an ignition system may be simulated by intentionally delaying the spark voltage to one or more spark plugs.

The testing device or misfire and tracking simulator of this invention is designed to be attached to an automotive ignition system and is provided with suitable control means so that the operator may simulate both plug misfire and plug tracking to test driver reaction thereto. It is contemplated that the testing device may be incorporated in an automotive engine ignition system in a vehicle which is test driven or, in the alternative, it may be placed in an ignition system which is being tested on an engine dynamometer. Through use of the device to precisely control the amount and timing of spark plug tracing and misfire, the effects of these malfunctions may be related to power loss, fuel economy, and other parameters.

The device described in the preferred embodiment below is designed to operate with a transistor ignition system which is powered by a twelve volt battery. The test device is powered by the twelve volt battery and, as described, is used to cause or simulate the misfire or tracking of the spark plugs of a multicylinder engine. Therefore, a signal input terminal of the testing device is connected to the output lead from the ignition distributor points while the output terminal of the device is directly connected to the transistor ignition system.

The preferred embodiment described below includes an adjustable counter which enables the operator to control the amount of misfire or tracking for the connected spark plugs. For example, the connected spark plugs may be caused to either misfire or track on every fourth opening to the distributor points which would result in a 25% misfire or tracking operation. Thus, the operator may control the operation from what may be termed a random malfunction to a 100% malfunction, which enables the accumulation of valuable test data and observance of drive reaction over a large range of operating conditions.

Accordingly, it is an object of this invention to provide an ignition test device which, when used with an automotive ignition system, will intentionally cause selected amounts of misfire or simulate selected amounts of tracking in the ignition system for observation and data compilation purposes.

It is another object of this invention to provide a tracking and misfire simulator for use with an automotive ignition system which can be selectively controlled by the operator to cause or simulate spark plug misfire or tracking throughout a wide range of incidence to enable data compilation relating to engine performance and also to test driver reaction thereto.

It is yet another object of this invention to provide a misfire and tracking simulator which may be used with an automotive ignition system and which may selectively be switched out of the system to allow for normal operation thereof, may be switched to a first condition to cause spark plug misfire over a wide range of incidence, may be selectively positioned over a wide range of incidence or may be switched off along with the ignition system when the automobile or engine is not being used.

Other objects and advantages of the invention described herein will be apparent to those skilled in the art, from the following detailed description of a preferred embodiment, reference being made to the accompanying drawings in which:

FIG. 1 is a block diagram of the preferred embodiment, showing the components of the tracking and misfire ignition system as they are related with the components of a conventional transistorized ignition system; and FIG. 2 is a circuit diagram of the tracking misfire and ignition system, showing certain conventional components in block form but with a detailed showing of the circuitry essential to provide the tracking and misfire functions.

General description of the invention

Because tracking, as previously explained, is simulated by delayed ignition, precise timing of the output signal from the tracking simulator is extremely important for proper operation. Accordingly, the circuitry of the invention including electrical pulse counters is designed to operate or to be actuated by the opening of the distributor points which is used to set the time of normal ignition. The opening of the contacts is used so that timing is not affected by floating contacts or point bounce at high speed so that these defects, inherent in any mechanical contact system, do not affect the timing and operation of the tracking and misfire simulator.

From the ignition points, shown schematically in FIG. 1, the square wave signal, whose shape is schematically indicated at point A in FIG. 1, is fed to a phase inverter, schematically shown in FIG. 1, which inverts the signal phase for use in the pulse shaper which may be a one-shot multivibrator. The one-shot multivibrator converts the inverse phase signal, shown at point B in FIG. 1, to the sharp pulse shape, shown at point C in FIG. 1. The spike signal from the pulse shaper is amplified, as shown at point D in FIG. 1, and is then fed to a pulse counter. The pulse counter is adjustable to be reset at any predetermined number upon receipt of a turn-on signal to a bistable multivibrator from the counters and a turn-off signal from the pulse shaper, at point C. The reset of the counter takes place at the time of turn-off of the bistable multivibrator.

A preset counter control may be set to give an output signal from the pulse counter to the bistable multivibrator at the end of a selected number of point openings or pulses which are received by a counter. For instance, the preset control may be adjusted so that the output signal, shown schematically at point E in FIG. 1, is fed to the bistable multivibrator at the end of every fourth or every tenth pulse, thereby creating a tracking or misfire condition for either 25 or 10 percent of the signals or point openings, respectively. The positive pulse from the pulse counter at point E is used to turn on the bistable multivibrator which is turned off by the next incoming pulse to the bistable multivibrator from the pulse shaper. The output signals from the bistable multivibrator, as shown after amplification at point F in FIG. 1, are used both to light a neon lamp and also as a reset signal for the pulse counter.

A four position function selector switch is used to control the operation of the device. One position is an "Off" position to be used when the ignition system is not in operation. When the four position switch is in the "Normal" position, the signal from the distributor points, shown at point A in FIG. 1, is fed to a 2-transistor signal discriminator, is then amplified and passed to a conventional transistor ignition system which controls the energy discharge of a coil whose output goes to a conventional mechanical distributor and thence to the spark plugs.

With the four position switch in "Tracking" position, the signal from the bistable multivibrator is fed to an "OR" circuit in the signal discriminator. The phase inverter signal, at point B shown in FIG. 1, is impressed upon a time delay device which comprises a one-shot multivibrator controlled by an "RC" time delay network which is turned on by the negative pulse in the phase inverter as the contact points open. The time delay device delays the signal to the signal discriminator which, when triggered by the amplified pulse from the bistable multivibrator through the four position switch, passes the delayed signal to the amplifier and thus to the coil and the ignition system. The result is that the discharge of energy from the coil is delayed and thus the voltage to the appropriate spark plug is late, thus simulating the condition of tracking. The amount of time delay when tracking is, of course, a function of engine speed and, will be seen below, the amount of time delay in the one-shot multivibrator including the RC network may be controlled by a tachometer control circuit.

When the four position switch is in "Misfire" position, the tracking circuit is disabled by grounding the base of one of the transistors of the "OR" circuit of the signal discriminator and the circuit operates normally until the signal from the bistable multivibrator is amplified and received by the signal with the "OR" circuit disabled, the signal from the bistable multivibrator blocks the output of the signal discriminator for one pulse so that the coil is not discharged. Thus the appropriate spark plug is not fired and a misfire is actually created.

*Detailed description of a preferred embodiment of the invention*

In describing a preferred embodiment of the invention with reference to FIG. 2, certain of the components are shown in block diagram. The details of these components will be well understood by those skilled in the art. The contact or breaker points, which are actually a part of the ignition system distributor, are actuated by a cam geared to the flywheel of the engine in a conventional manner. The phase inverter may be a single transistor, one-stage phase inverter while the pulse shaper is preferably a one-shot multivibrator which has a small pulse width of, for example, 1 millisecond. The pulse counter which receives the amplified signal from the pulse shaper may be an electronic or electro-mechanical device which allows the operator to select the sequence or number of pulses received for every outgoing signal. Preferably, the pulse counter may be controlled so that the output signal varies anywhere from 0 to 100 percent of the repetition rate of the received pulses. Such a pulse counter for use in the described preferred embodiment is commercially available in a number of models from Computer Measurements Company of San Fernando, Calif.

Referring now to FIG. 2, the points are connected across a ground line 10 and a positive line 11 through a resistor 12. The voltage across the resistor 12 is used to operate the circuitry as will be subsequently explained.

The positive terminal of a 12 volt battery $B_1$ is connected to the positive line 11 through one gang of the four position switch. Lines 10 and 11 are continued in the lower portion of FIG. 2 which is a continuation of the upper portion but separated by a broken line $x$.

The bistable multivibrator, which is turned on by the signal from the pulse counter and turned off by a subsequent signal from the pulse shaper, comprises a pair of PNP transistors 13 and 14 having their collectors connected to a line 10 through a pair of load resistors 15 and 16, respectively, and their emitters joined by a line 17 which is connected to the line 11 through a resistor 22 and filtered by a capacitor 18. The base of the transistor 13 is connected to the collector of the transistor 14 by a line 19 through a resistor 20 while the base of the transistor 14 is connected to the collector of the transistor 13 through a resistor 21. The line 17 is connected to the positive terminal of the battery B or line 11 across a voltage dividing resistor 22. The bases of the transistors 13 and 14 are connected to the line 17 through resistors 25 and 26 respectively.

The output of the pulse shaper, at point C in FIGS. 1 and 2, is connected to the base of the transistor 14 by a line 27 through a doide 28 while the output of the pulse counter, at point E, is connected to the base of the transistor 13 by a line 29 through a diode 30, a capacitor 31 and the line 19.

As previously explained, the pulse counter may be preset to generate a positive pulse through the line 29 to the bistable multivibrator including the transistors 13 and 14 at the end of a predetermined number of pulses or counts received from the amplifier at point D, shown in FIGS. 1 and 2. If the pulse counter is set at 25% for instance, at the end of each fourth incoming pulse, the pulse counter will produce a positive signal which is conducted by the line 29 through the diode 30 to the base of the transistor 13 which turns on the bistable multivibrator. The bistable multivibrator including transistors 13 and 14 remain on until the next positive signal is received from the pulse shaper, at point C, through the line 27 at the base of the transistor 14.

The output of the bistable multivibrator is fed directly to the base of the transistor 32 across a resistor 33. This output, which is turned on by a signal from the pulse counter and is turned off by the next signal from the pulse shaper as previously explained, is used for two purposes. First, it is amplified by the transistor 32 which is connected across lines 10 and 17 through a resistor 34 and the amplified output thereof is connected to a line 35 which through a diode 41 and the four position switch, connects to the signal discriminator, as will be subsequently explained. The collector of the transistor 32 is also connected to the base of a second amplifying transistor 36 through a resistor 37. The transistor 36 is connected across lines 10 and 11 through a voltage dividing resistor 38 with its base connected to line 11 through a resistor 39. The collector of the transistor 36 is directly connected by a line 40 to the decade counter. Second, when the bistable multivibrator including transistors 13 and 14 is turned on for a short time, the signal therefrom is amplified by the transistors 32 and 36, and is conducted by the line 40 to the pulse counter. This signal which is conducted by the line 40 to the pulse counter is used as the "reset signal" which returns the counter to zero count and starts the counting sequence again required prior to generation of another "turn on" signal at point E. The neon indicator lamp 42 and its amplifier is connected between the line 40 and ground so that the lamp is illuminated by each of the reset signals from the amplifying transistors 32 and 36.

Referring to the lower half of FIG. 2, the amplified output of the bistable multivibrator is connected by the line 35 to two terminals of a second or middle gang of a three gang, four position switch, generally designated by reference number 43. The switch 43 has four contacts, $a$, $b$, $c$, and $d$, which correspond, respectively, with the circuit functions "Ignition Off," "Normal Ignition," "Tracking" and "Misfire."

With the selector switch 43 in the *a* or Ignition Off position, the connection between the positive pole of the battery B and line 11 is broken, so that the system is not energized. With the switch 43 in the *b* or Ignition Normal position, the battery B is connected across lines 10 and 11 but the connection between the line 35 which leads from the bistable multivibrator through the middle gang of the switch 43 to further components of the system is broken. The ignition signal from the ignition points, at point A in FIGS. 1 and 2, is directly connected to the signal discriminator including a pair of PNP type transistors 44 and 45 by line 46 extending from the points to the base of the transistor 45 through a resistor 47.

The transistors 44 and 45 comprise an "OR" gating circuit which receives the (a) signals directly from the ignition points through line 46, as previously explained, (b) the time delay or tracking signal from an RC time delay circuit which will be subsequently described, or (c) a blocking signal from the bistable multivibrator. The "OR" circuit including the transistors 44 and 45 selectively generates a timed output signal through a pair of amplifying transistors 48 and 49. The amplified signal from the transistors 48 and 49 is conducted to the ignition system terminals and acts as the triggering pulse for a conventional transistorized ignition system.

The "OR" transistors 44 and 45 are connected in series across lines 10 and 11 through a voltage dropping resistor 50 connected between the collector of the transistor 45 and the line 10. The amplifying transistors 48 and 49 are connected across lines 10 and 11 through voltage dropping resistors 51 and 52, respectively. The collector of the transistor 45 is connected to the base of the amplifier transistor 48 through a resistor 53 and the base of the amplifier transistor 48 is connected to the line 11 through a bias resistor 54. Finally, the base of the transistor 44 is connected through a resistor 55 through the right hand gang of the switch 43. The line 10 is connected to this gang of the switch 43 only at the *d* or Misfire terminal. A base of the transistor 44 is connected to the line 11 across a bias resistor 56.

During normal ignition, with the switch 43 in *b* position, the connection between the bistable multivibrator through the line 35 is open and thus the sole signal received by the "OR" transistors 44 and 45 is directly from the ignition points in the line 46 which connects with the base of the transistor 45. Transistor 44 is so biased that, in the absence of a signal at its base, it is conducting and the transistor 45 is so biased that the signal from the ignition points through the line 46 turns it on. Both transistors 44 and 45 conduct for the length of the signal A from the ignition points. The output thereof is applied to the base of the transistor amplifier 48 and through the second amplifier transistor 49 to the ignition system terminals. When the selector switch 43 is turned to the *c* or Tracking position, the circuit between the bistable multivibrator through line 35 is completed through the middle gang of the switch 43 to the base of the "OR" transistor 45. At the same time, a time delay signal is being produced by the time delay mechanism which includes a one-shot multivibrator including transistors 57 and 58 which are operably connected to an adjustable RC time delay network.

The transistors 57 and 58 have their emitters connected to the line 11 through a resistor 60 with the collector of the transistor 57 connected to the base of the transistor 58 through the variable capacitance selection unit 61 which is actuated by a time delay selector switch 62 which also controls a variable resistor unit 63, one side of which is connected across an adjustable resistor or rheostat 64 to the line 11 for low speed calibration. The other side of the variable resistor unit 63 is connected to the base of a NPN type transistor 65 having its collector connected to the base of the transistor 58 through a resistor 66 and its emitter connected to a line 67 which is separated from the line 11 by a capacitor 68. Finally, the base of the transistor 65 is connected to the line 67 across a resistor 69 and the line 67 is connected to the ground line 10 across a resistor 70. The collector of the transistor 57 is connected to the line 67 and through resistor 71 while the collector of the transistor 58 is connected to the base of the transistor 57 by a line 72 through a resistor 73 and thence to the positive line 11 through a resistor 74. The line 72 is connected to the line 67 and the emitter of the transistor 65 through a resistor 72*a*.

The one-shot multivibrator including the transistors 57 and 58 is so biased that it remains in "off" condition in the absence of a signal applied to the base of a transistor 57. When the ignition points open, the signal from the phase inverter, at point B, is applied through the line 75, a capacitor 76 and a forward biased diode 77 to the base of the transistor 57, turning this transistor on. With the transistor 57 turned on, the one-shot multivibrator continues until it is turned off at a predetermined later time, depending upon the time constant of the RC circuit including the variable capacitance unit 61 and the variable resistor unit 63. As previously explained, the RC values may be varied to select a given time constant to approximate the amount of "tracking" in the system. A resistor 78 connects one side of the capacitor 76 to the line 11.

With the multivibrator including transistors 57 and 58 turned on, the output therefrom is applied to the base of the "OR" transistor 44 through a forward biased diode 80 and a resistor 81.

The pulse directly from the ignition points through the line 46 was applied through a resistor 82 and a forward biased diode 83 to the base of the transistor 44, turning it on. Thus, when the switch 43 is in *c* or Tracking position, both (a) the pulse directly from the points through the line 46 and (b) the signal from the one-shot multivibrator consisting of transistors 57 and 58 are applied to the base of the transistor 44, turning it on. Upon opening of the ignition points, the signal in line 46 ceases, but the signal applied to the base of the transistor 44 across the diode 80 remains for a predetermined time after the points have opened due to the effect of a resistor 82 and a capacitor 79.

After the one-shot multivibrator times out, transistor 44 is turned off which, as previously explained, actuates the transistor ignition system through the amplifying transistors 48 and 49. Thus the ignition at the spark plug is delayed by a predetermined amount, simulating the condition of tracking as previously defined.

Since tracking or delayed ignition is desirably calibrated in degrees of crankshaft rotation, and is a function of engine speed, the time delay of the RC network is varied in proportion to engine speed. A tachometer circuit consisting of a capacitor 84, diodes 85 and 86, a capacitor 87, and a high speed calibration control 88 is used to differentiate the signals from the phase inverter from the line 75 which is then supplied to the base of the transistor 65 through a resistor 89 and the variable resistor unit 63. The differentiated signal from the tachometer circuit at the base of the transistor 65 becomes more positive with respect to the emitter of the transistor 65 as speed increases, thus causing this NPN type transistor to conduct more and to decrease the effective RC time constant which delays the turn off of the multivibrator including transistors 57 and 58. The variable resistors or rheostats 64 and 88 are used to calibrate the setting of the tachometer control circuit.

When the four position switch 43 is placed in *d* or Misfire position, the tracking or time delay circuit previously described is disabled by grounding the base of the transistor 44 through the resistor 55 and the *d* terminal of the right hand gang of the switch 43. The system remains in Normal operation with the transistor 45 being turned on and off by the signal from the points applied at its base through the line 46 across the resistor 47 until the counter reaches its preset value and a signal from the bistable multivibrator including transistors 13 and 14 is applied to the base of the transistor 45 through the line 35, across a resistor 90, through the *d* position of the middle gang of the switch 43, to hold this transistor on after the points have closed and the normal signal through the line 46 has ceased. With the transistor 45 held on, the transistorized ignition system does not discharge and a misfire occurs.

It will be seen from the above detailed description of a preferred embodiment of this invention that the device, when used with an automotive ignition system, is capable of simulating tracking (delayed ignition) and causing misfire and may also be used for normal operation. Furthermore, the percent of misfire may be adjusted by means of the preset counter while the percent of tracking may be adjusted by means of the counter and the amount of tracking or the time of delayed ignition may be adjusted through use of the time delay network 59.

Accordingly, the described device provides a useful research and training tool for accumulating data relating to power loss and other engine performance parameters and may also be used to observe and train driver reaction to these two common malfunctions of an automotive ignition system.

It is to be understood that substitution of equivalent circuitry or components may be readily made by persons skilled in the art, such as the use of various transistor types and other components for accomplishing phase inversion, pulse shaping, etc. These and various other modifications of the above described preferred embodiment will be apparent to those skilled in the art and it is to be understood that such modifications can be made without departing from the scope and tenor of the accompanying claims.

I claim:

1. A device for use with an ignition system for causing selected amounts of ignition misfire or for simulating selected amounts of ignition tracking comprising, in combination, an electrical pulse counter for connection to the points of the ignition system, control means associated with said pulse counter whereby said pulse counter may be programmed to pass a signal after the receipt of a predetermined number of pulses from said ignition points, a time delay device for connection to said points for delaying the pulses received therefrom by predetermined amount, a signal discriminator operably connected to said ignition points, said time delay device, said pulse counter and the coil of said ignition system, and a function selector operably connected to said signal discriminator whereby, when said selector is in a first position, said signal discriminator will pass pulses from said points to said coil for normal ignition, and whereby, when said selector is in a second position, said signal discriminator will pass a delayed pulse to said coil after passing said predetermined number of pulses set by said counter from said points to said coil, thereby simulating ignition tracking through delayed ignition, and whereby, when said selector is in a third position, said signal discriminator will prevent passage of a pulse to said coil after passing said predetermined number of pulses set by said counter from said points to said coil, thereby causing ignition misfire.

2. The device of claim 1 which further includes a bistable multivibrator operably connected to said points, said pulse counter and said signal discriminator such that said multivibrator is turned on by the signal passed from said pulse counter and is turned off by the next succeeding pulse from said points, the output from said multivibrator being operably connected to said signal discriminator through said function selector.

3. The device of claim 2 wherein the output of said multivibrator is connected to said pulse counter and wherein said pulse counter is reset to start a succeeding count of said predetermined number of pulses by said output signal from said multivibrator.

4. The device of claim 2 which further includes a visual indicator means actuated by said output from said multivibrator.

5. The device of claim 1 wherein said signal discriminator includes a gating circuit operably connected to said points, said time delay device, said pulse counter and said coil whereby, when said function selector is in said first position, the pulses from said points will be passed to said coil for normal ignition, and whereby, when said function selector is in said second position, said gating circuit will remain on for a predetermined time longer than the duration of said pulse from said points after passage of a predetermined number of pulses set by said counter, thereby simulated ignition tracking through delayed ignition and whereby, when said function selector is in said third position, said gating circuit is held on until the next succeeding pulse from said points after said predetermined number of pulses set by said counter have passed, thereby causing ignition misfire.

6. The device of claim 5 wherein said gating circuit comprises a pair of transistors, having emitter, collector and control electrodes, said transistors having their emitter-collector circuits connected in series across a power supply with the collector of the first transistor connected to the emitter of the second transistor and the collector of said second transistor operably connected to said ignition coil, means connecting said ignition points, said time delay device, said pulse counter and said function selector to said control electrodes whereby, when said function selector is in said first position, pulses directly from said ignition points are applied to said control electrodes causing said second transistor to conduct for the duration of said pulses, thereby passing normal ignition signals to said coil, and whereby, when said function selector is in said second position, a pulse from said time delay device is applied to said control electrodes after passage of said predetermined number of pulses set by said counter, said time delay pulse causing said transistors to conduct for a period longer than period of conduction during normal ignition, thereby simulating ignition tracking through delayed ignition and whereby, when said function selector is in said third position, after the passage of said predetermined number of pulses set by said counter, the control electrode of said first transistor is grounded and said second transistor is held on until the next succeeding pulse from said points, thereby causing ignition misfire.

7. The device of claim 1 wherein said time delay device comprises a one-shot multivibrator including an RC time delay circuit operably connected to said points, said one-shot multivibrator remaining in a state of non-conduction in the absence of a signal from said points and being turned on by such signal, said RC time delay circuit being effective to hold said multivibrator on for a time longer than the length of said signal from said points.

8. The device of claim 7 wherein said time delay circuit further includes means for varying the time constant of said RC time delay circuit in proportion to the repetition rate of said pulses from said points, whereby the period of conduction of said one-shot multivibrator decreases as the repetition rate of said point pulses increases.

References Cited

UNITED STATES PATENTS

| 2,741,037 | 4/1956 | Devoe | 35—13 |
| 3,202,146 | 8/1965 | Short et al. | 123—148 |
| 3,314,407 | 4/1967 | Schneider | 123—148 |

EUGENE R. CAPOZIO, *Primary Examiner.*

W. W. NIELSEN, *Assistant Examiner.*

UNITED STATES PATENT OFFICE
CERTIFICATE OF CORRECTION

Patent No. 3,357,114                                   December 12, 1967

Sam J. Green

It is hereby certified that error appears in the above numbered patent requiring correction and that the said Letters Patent should read as corrected below.

Column 1, line 42, for "tracing" read -- tracking --; line 65, for "drive" read -- driver --; column 2, line 14, after "positioned" insert -- to provide simulated spark plug tracking or delayed ignition --; column 4, line 10, for "a" read -- ground --; lines 12 and 13, after "filtered" insert -- to ground --; lines 17 to 19, strike out "The line 17 is connected to the positive terminal of the battery B or line 11 across a voltage dividing resistor 22."; line 24, for "doide" read -- diode --; line 39, for "remain" read -- remains --; same column 4, line 50, after "41" insert -- , resistor 90, --; column 5, lines 5 and 7, for "B", each occurrence, read -- $B_1$ --.

Signed and sealed this 25th day of February 1969.

(SEAL)
Attest:

EDWARD M. FLETCHER, JR.                        EDWARD J. BRENNER
Attesting Officer                                      Commissioner of Patents